United States Patent [19]

McNaney, Jr. et al.

[11] Patent Number: 4,948,083
[45] Date of Patent: Aug. 14, 1990

[54] SWIVEL BASE MOUNT FOR DOWNRIGGER

[75] Inventors: Thomas F. McNaney, Jr., Newtown Square; Rudolph Effinger, Feasterville, both of Pa.

[73] Assignee: Penn Fishing and Tackle Mfg. Co., Philadelphia, Pa.

[21] Appl. No.: 339,088

[22] Filed: Apr. 17, 1989

[51] Int. Cl.⁵ ............................................. F16M 13/00
[52] U.S. Cl. .................. 248/514; 248/289.1; 43/21.2
[58] Field of Search ............ 248/514, 289.1, 500; 43/27.4, 21.2, 43.12; 403/96, 97, 146

[56] References Cited

U.S. PATENT DOCUMENTS

| | | | |
|---|---|---|---|
| 1,540,374 | 6/1925 | Stevens | 403/97 X |
| 2,314,747 | 3/1943 | White | 43/21.2 |
| 2,580,130 | 12/1951 | Rowdon | 43/21.2 |
| 2,888,770 | 6/1959 | Patrick | 43/4 |
| 3,322,388 | 5/1967 | Budreck | 248/289.1 |
| 3,484,066 | 12/1969 | Aunspaugh | 248/41 |
| 3,570,793 | 3/1971 | Schackel | 248/42 |
| 3,719,331 | 3/1973 | Harsch | 242/106 |
| 3,866,878 | 2/1975 | Yamamoto | 248/500 |
| 3,889,908 | 6/1975 | Larson | 403/97 X |
| 3,937,415 | 2/1976 | Prinz | 242/106 |
| 4,044,489 | 8/1977 | Henze et al. | 43/27.4 |
| 4,773,503 | 9/1988 | Purkapile | 403/97 X |
| 4,815,740 | 3/1989 | Williams et al. | 403/97 X |

OTHER PUBLICATIONS

Owner's Manual for Fathom-Master 800-820 Downrigger, Penn Fishing Tackle Mfg. Co. (1985), pp. 6 & 13.

Primary Examiner—David L. Talbott
Assistant Examiner—Daniel Hulseberg
Attorney, Agent, or Firm—Benasutti

[57] ABSTRACT

A swivel base for a downrigger which can be easily unlocked, rotated to a new angle and relocked. The base comprises a swivel plate rotatably mounted over a fixed plate. The plates have toothed locking rings which are engaged or disengaged by the cam action of an adjusting ring.

20 Claims, 3 Drawing Sheets

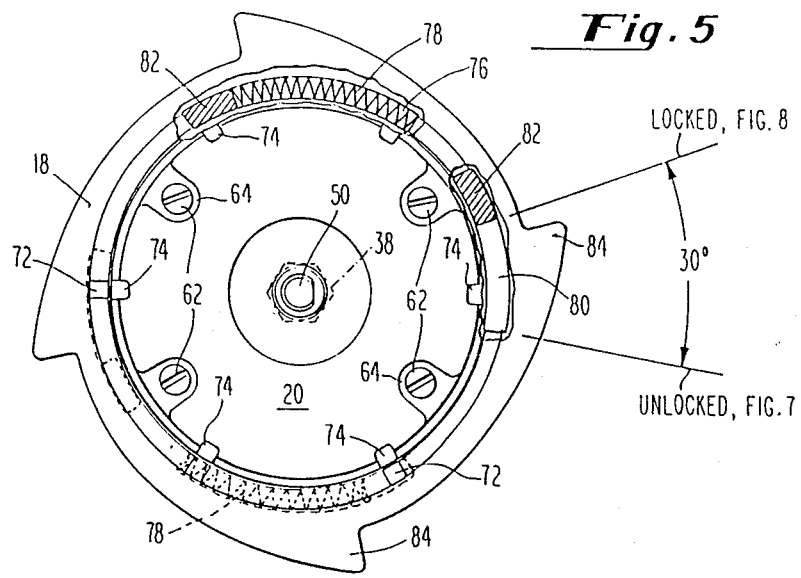
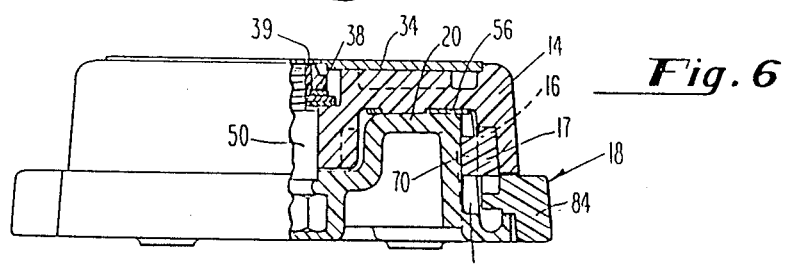
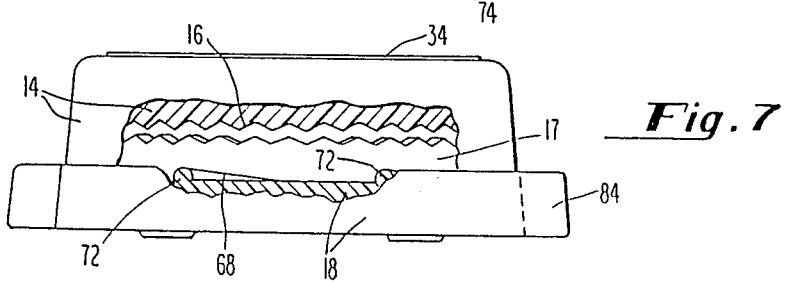
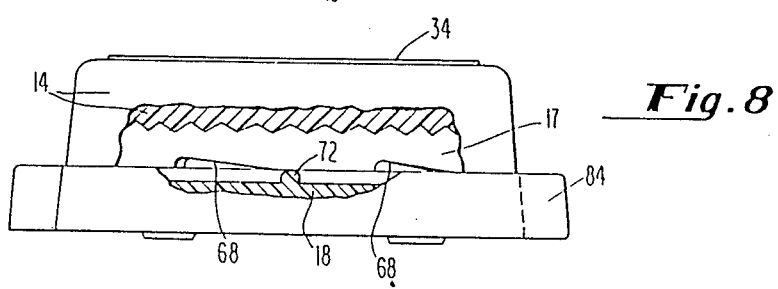

SWIVEL BASE MOUNT FOR DOWNRIGGER

BACKGROUND OF THE INVENTION

This invention relates to fishing tackle. More particularly, it relates to an adjustable swivel base for mounting a downrigger to a fishing boat in a manner which allows the downrigger's boom to be rotated to different angular positions relative to the boats longitudinal axis.

Downriggers are well known systems for trolling at a precise water depth. In the typical set-up, a short boom with a windlass or electric winch is used to lower a heavy lead trolling weight attached to a cable. Since the weight is relatively heavy, it maintains a constant depth throughout speed changes and turns. By contrast, the relatively light artificial lures and baits used for trolling would tend to change depth easily if not used in conjunction with a downrigger system. The fishing line is attached to a release mechanism on the trolling weight, or on the cable, and trails the lure or bait well behind the weight at a controlled depth. Due to variations in the water temperature profile, salinity, oxygen level or bottom structure, fish tend to concentrate at narrow bands of water depth. Controlled depth trolling is a very effective and productive means to catch these fish.

Frequently, the downrigger apparatus has a fishing rod holder mounted near the base of the boom. Several downrigger/rod combinations can be mounted on the sides or stern of a boat, allowing a fisherman to troll with several rigs at once. When a fish strikes one of the rigs, the fisherman can remove that rod from its holder and begin playing the fish. Meanwhile, a mate or another fisherman reels in the other lines and cables to avoid entanglement.

In using multiple downriggers, it is advantageous to point the downrigger booms at different angles along the longitudinal axis of the boat to keep the trolling lines separated. While fixed position mounts can be installed at angles to provide a set configuration, it has been found more convenient to use adjustable swivel mounts. These mounts allow immediate configuration changes, and the convenience of swinging the boom inboard for adjustment of the release clip or removal of the trolling weight. A prior example of such a swiveling downrigger is shown in U.S. Pat. No. 3,937,415 to Prinz.

With many downriggers, the frame, boom, windlass, and rod holder detach from a mounting base which is bolted or screwed onto the boat structure, so that they can be removed and stored when not in use. Consequently, it is advantageous to make the mounting base, rather than the downrigger frame, adjustable to the desired angle. An example of such swivel base mount is shown in U.S. Pat. No. 4,044,489 to Henze. A more recent swivel base mount of that type is the Adjustable Swivel-Matic Base manufactured and sold by Penn Fishing Tackle Mfg. Co. of Philadelphia, PA.

OBJECTS OF THE INVENTION

The principal object of the present invention is to provide an improved swivel base for downriggers wherein the base can be unlocked, swiveled to a new angle, and locked with greater ease than previously provided.

Another object is to provide a larger section of adjustment angles, specifically, a full 360° range of adjustments with smaller angular increments, than was previously provided.

Another object is to provide a more durable and reliable adjustment means.

Another object is to provide ease and simplicity in installing the base to the boat structure.

Another object is to provide for the mounting of various downriggers on the swivel base.

Other objects and advantages of the invention will become apparent upon reading the specification and drawings.

SUMMARY OF THE INVENTION

The present invention results in a downrigger mount which can easily be adjusted in small angular increments over a 360° range. It comprises a swivel plate rotatably mounted over a fixed base plate, each plate having a toothed locking ring associated with it. The number of teeth defines the fixed angular positions. The locking rings and their opposing teeth are engaged or disengaged by the cam action of an adjusting ring. The adjusting ring is spring loaded to hold the teeth in the locked position, and thereby fix the downrigger angle. The mount can be easily unlocked for adjustment by rotating the adjusting ring through a small arc segment. The symmetry of the plates, and an aperture for access to the mounting screws, provides simplicity and ease of mounting to the boat. A universal mounting plate attached to the swivel top plate allows for the mounting of various downrigger apparatus or other fishing or boating gear.

BRIEF DESCRIPTION OF THE DRAWINGS

FIG. 5 is a top view of the swivel base bottom plate with partial cut out showing the adjusting ring and return springs.

FIG. 6 is a side view with partial cut-out cross-sectional view of the swivel base mount, not including universal mounting plate.

FIG. 7 is a side view with partial cut-out showing the locking and adjusting rings in the unlocked position.

FIG. 8 is a side view with partial cut-out showing the locking and adjusting rings in the locked position.

DETAILED DESCRIPTION

Figure 1:
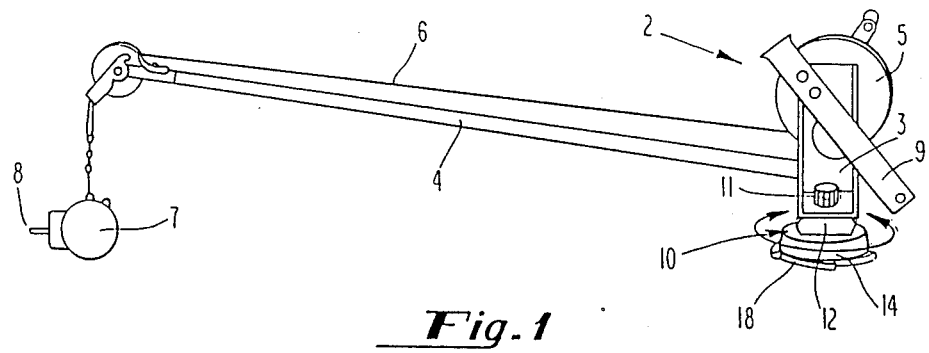
FIG. 1 is a perspective view of a typical downrigger system on a swivel basemount.

Referring to FIG. 1, a typical downrigger apparatus 2 is mounted upon a swivel base mount 10. The downrigger apparatus 2 includes a frame 3, boom 4, windlass 5, cable 6, and trolling weight 7 with line release 8. A rod holder 9 is mounted on the frame at the base of the boom opposite the windlass.

One or more downriggers are typically mounted on the stern or along the sides of a fishing boat. The downrigger apparatus is usually detachable from the base so that it can be removed when not in use.

Multiple downriggers are normally aligned at different angles to the longitudinal axis of the boat to maintain cable and fishing line separation. With fixed base mounts, the angles are set when the mounts are installed. However, with swivel mounts, each downrigger can be adjusted through a range of angles, providing a variety of trolling configurations and the convenience of being able to bring the boom inboard for line adjustment, weight attachment or removal, to prevent contact with piers, or any other reason.

Figure 2:
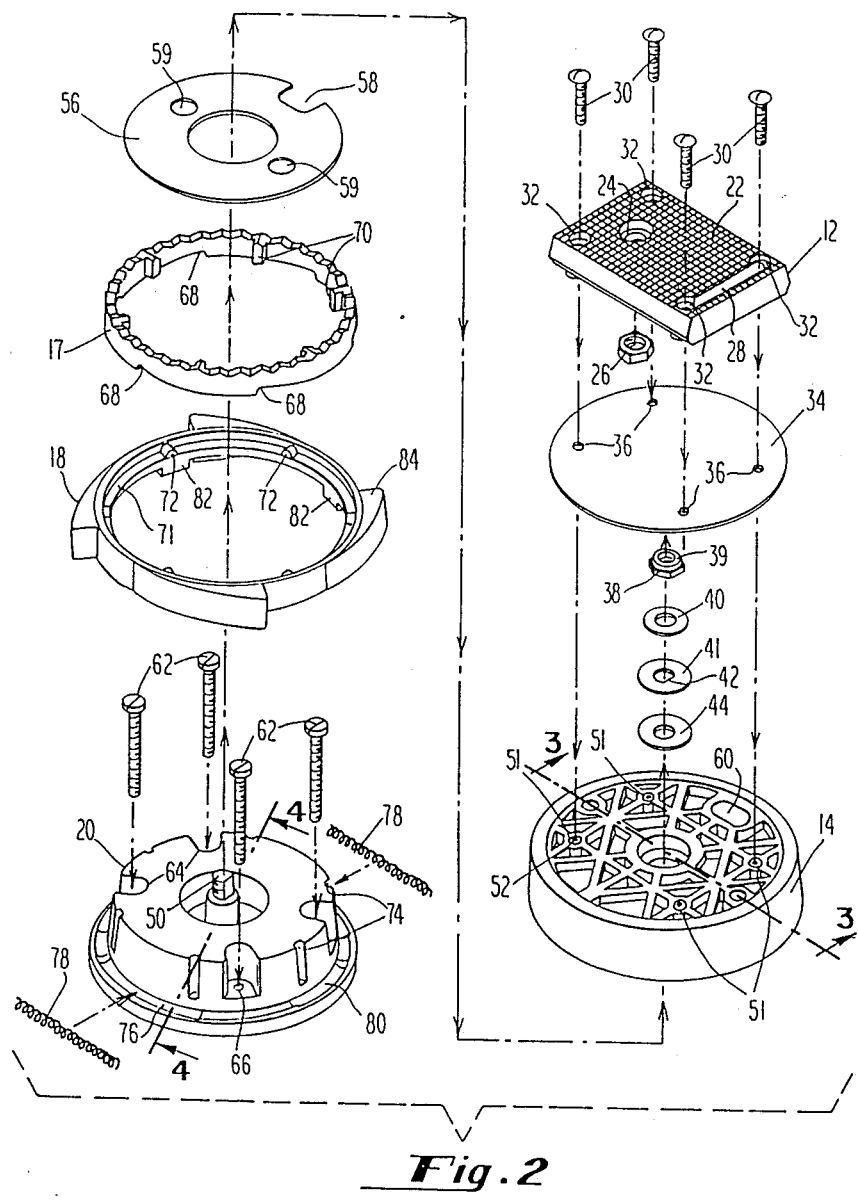
FIG. 2 is an exploded isometric view of the swivel base mount.

FIG. 2 shows a swivel base mount 10 embodying the present invention. Although the individual elements are explained in detail below, main elements of the mount are a mounting plate 12, a swivel top plate 14, two toothed locking rings 16, 17 (16 not shown in FIG. 2), an adjusting ring 18 and a fixed bottom plate 20. The mounting plate 12 is used to mount the downrigger apparatus. It is preferably constructed of a non-corrosive resilient material with a non-skid grid surface 22. An off-centered bolt hole 24 accepts a bolt (not shown) from the downrigger frame 3, which is capped by a hand tightening knob 11, as shown in FIG. 1. A stainless steel hexagonal nut 26 fits into a chamber in the underside of the mounting plate 12, to accept the downrigger bolt through the hole 24 and fasten the downrigger frame firmly against the non-skid surface 22. A flange 28 is provided at the end of the mounting plate 12 opposite the bolt hole 24 and acts as a stop for the downrigger frame. The mounting plate 12 is attached to the swivel top plate by four stainless steel screws 30 in countersunk screw holes 32 at each corner.

A thin cover plate 34 is disposed between the mounting plate 12 and the top plate 14, and has four screw holes 36 alignable with the holes 32 of the mounting plate 12. A hexagonal lock nut 38 with an unthreaded nylon insert 39, a tension washer 40, a brass drag washer 41 with a bore flat 42, and a nylon drag washer 44 are provided for rotatable attachment of the top plate 14 to a brass swivel shaft 50 in the bottom plate 20. The stainless steel tension washer 40 is slightly convex so that it acts as a Belleville spring as it is flattened between the lock nut 38 and the brass drag washer 41. The nylon drag washer 44 may rotate on the shaft 50, while the flat 42 prevents the brass drag washer 41 from rotating. It will be apparent to one skilled in the art that the drag washers 41, 44 therefore provide a frictional drag resistance to rotation of the top swivel plate 14, variable by the tightening of lock nut 38.

Figure 3:
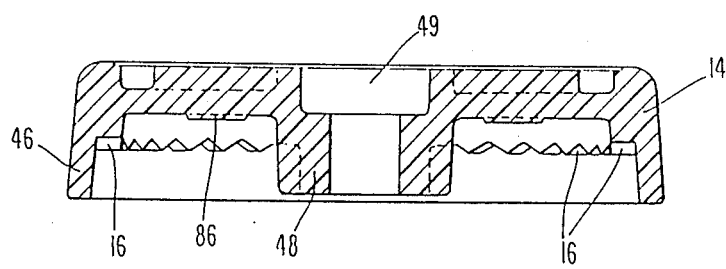
FIG. 3 is a cross-section of the swivel base top plate along 3—3 of FIG. 2.

The swivel top plate 14, shown in cross section in FIG. 3, is preferably constructed of a non-corrosive material such as a reinforced polymer. It is a molded circular plate, with an exterior skirted flange 46 and an interior reinforcing collar 48 integrally molded into it. A circular chamber 49 coaxial with the plate 14 and the reinforcing collar 48 receives the above described lock nut 38, tension washer 40, and drag washers 41, 44 when they are tightened onto the brass swivel shaft 50.

As best seen in FIG. 6, the top surface of the swivel top plate 14 is slightly recessed to receive a cover plate 34. Four bosses 51 with threaded brass inserts 52 receive the four screws 30 which attach the mounting plate 12 and cover plate 34 to the swivel top plate 14.

The top plate 14 is molded with a toothed locking ring 16 (shown in FIG. 3) on its underside. The serrated teeth of the locking ring 16 interlock with the opposing teeth of a second locking ring 17 associated with the fixed bottom plate 20, as more fully described hereafter. In this configuration, thirty-six teeth are provided in each ring with equal spacing between their crests, thus providing thirty-six angular positions, or one every 10°. Such small intervals essentially constitute infinite adjustment within the requirements of downrigger placement.

It should be apparent that other equivalent, complimentary engaging means, such a spaced circular bosses and corresponding recessed holes, could be used in lieu of toothed rings. Further, the locking ring 16 could be molded separately and attached to the swivel top plate 14. These and other minor variations and modifications consistent with the scope of this invention will be apparent to anyone skilled in the art.

Referring again to FIG. 2, a polymer drag plate 56 acts as a thrust washer and friction pad between the swivel top plate 14 and fixed bottom plate 20. In cooperation with the drag washers 41, 44 it provides frictional resistance to rotation of the top plate 14, so that even when the mount is unlocked, some force is necessary to move the boom. This is primarily for convenience of adjustment, as a free swinging boom is difficult to handle under many circumstances. The amount of drag resistance can be set by adjusting the lock nut 38 on the swivel shaft 50.

The drag plate 56 has an access hole 58 open to its circumference, and two interior holes 59. The interior holes 59 receive bosses 86 of the top plate 14, shown in FIG. 3. These bosses 86 fix the drag plate 56 to the top plate 14 to assure that they rotate as a unit in relation to the bottom plate 20. The access hole 58 thereby remains under an oval access 60 through the top plate 14, through which the mounting screws 62 may be easily accessed for installation, tightening or removal. As seen in FIG. 2, the bottom plate 20 has four roughly U-shaped indentations on its circumference forming chambers 64 terminating in screw or bolt holes 66. Four mounting screws 62 are used to fix the bottom plate 20 to the boat's structure.

The convenient access to the mounting screws 62 provided by the above structure provides several advantages. The top swivel plate 14 need not be detached from the bottom plate 20 to gain access to the screws 62. Consequently, the drag washer assembly need not be removed or the drag settings changed. For example, if the mounting screws 62 need to be tightened or removed, only the mounting plate 12 and cover plate 34 need to be removed, via the four upper screws 30. Then the operator will rotate the adjusting ring to unlock the locking rings 16, 17, and swivel the top plate access hole 60 over a mounting screw 62. The chambers 64 are sufficiently large to fit the blade of a screwdriver or the head of a socket wrench for adjustment.

Further, since the mount provides 360° rotation with set intervals, it cannot be installed backwards or quartered, as can 180° bases such as shown in U.S. Pat. No. 4,044,389. The coverplate 34 has the same screw hole pattern as the bottom plate 20, and can be used as a template to drill holes in the boat's structure. Orientation of hole pattern is not important, due to the symmetry and 360° rotation of the mount. Then the mount can be assembled up to the top plate 14, placed over the drilled holes, and the mounting screws 62 inserted through the access hole 60, thus eliminating the difficulty of assembling the mount on a bobbing boat where parts may be dropped overboard. Once the partially assembled mount is fixed to the boat, only the cover plate 34 and mounting plate 12 remain to be attached.

Locking or unlocking of the teeth on the locking rings 16, 17 is accomplished by camming surfaces on the lower locking ring 17 and cam followers on the adjustment ring 18, as described below. The lower locking ring 17 has six equally spaced cam profiles 68 on its underside, and six vertical channel followers 70 on its inner radius. The adjusting ring 18 has an inner lip 71 upon which the lower locking ring 17 rests, and six raised equally-spaced half cylindrical cam followers 72. The bottom plate 20 has six equally- spaced vertical channels 74 which receive the channel followers 70 of the lock ring 17. It can easily be understood, and visualized by reference to FIG. 8, that rotating the adjusting ring 18 until the cam followers 72 are out of the cam profiles 68 raises the lower locking ring 17 into engagement with the upper locking ring 16. In reference to FIG. 7, rotating the adjusting ring 18 until the cam followers 72 are completely in the bite of the cam profiles 68 lowers the lower ring 17 out of engagement. The vertical channels 74 and channel followers 70 allow vertical movement of the locking ring 17, but the other portions of the mount and the downrigger itself do not move vertically.

Figure 4:
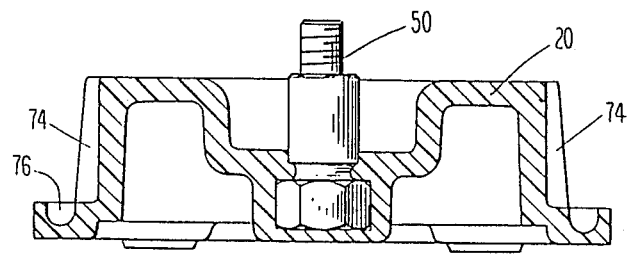
FIG. 4 is a cross-section of the swivel base bottom plate along 4—4 of FIG. 2.

FIG. 4 illustrates more detail of the fixed bottom plate 20 and its embedded brass swivel shaft 50. In the embodiment shown, the shaft 50 is molded into the bottom plate 20, which has a generally cylindrical shape with hollow interior. Variations in the mold configuration can obviously be made without altering the plate's general shape or function, hence the depicted molding is not significant. However, a significant feature is the springs 78 and spring pockets 76, best seen in FIGS. 2, 4, and 5. In this embodiment, two helical coil springs 78 rest in two diametricly opposite spring pockets 76. Two stop limiter pockets 80 are located 90° from the spring pockets 76, to receive rails 82 generally conforming in shape to the pockets 76, 80. Four such rails 82 are located on the bottom surface of the adjusting ring 18 at 90° intervals. Two of rails 82 align into the spring pockets 76 behind the springs 78 and act as spring followers, while the other two rails 82 slip into the limiter pockets 80 and provide stop limits. It can be seen that the springs 78 push against the rails 82 to hold the ring 18 against a stop limit at one end which corresponds to the cam followers 72 being out of the cam profiles 68 of the lower locking ring 17 (locked condition) as shown on FIG. 8. Turning the adjusting ring 18 against the springs 78 allows the cam followers 72 to enter the bite of the cam profiles 68 (unlocked position) as shown in FIG. 7, at which point further rotation of the adjusting ring 18 is prevented by the rails at the other end of the stop limiter pockets. Thus, a small manual rotation of the adjusting ring 18 (about 30° of arc in the depicted embodiment) allows immediate unlocking for rotation of the swivel top plate 14. The adjusting ring 18 has four finger tabs 84 and a textured surface to assist in rotation The limiter pockets 80 are sized to prevent the springs 78 from being over-compressed past the cam profile's bite, as the limit stop rails 82 will contact the end of the limiter pockets 80 before that occurs.

It should be apparent that other equivalent spring and limiter configurations, along with other minor modifications and variations can be made consistant with the scope of the invention. However, the depicted embodiment provides a special symmetry in that the rails 82 can be identically sized, so that any opposed pair can enter the spring pockets 76 or the limiter pockets 80, allowing the adjusting ring 18 to be easily installed. A spring diameter is chosen which is slightly greater than the depth of the spring pockets 76, so that the rails 82 push the springs 78 ahead of them before falling into the pockets 76 during installation of the adjusting ring 18.

The foregoing description of the preferred embodiment is meant to be illustrative of the invention, rather than limiting the scope of the invention to that particular embodiment. The full scope of the invention is defined in the claims which follow.

We claim:

1. A swivel base mount for mounting a fishing apparatus on a boat, comprising:
    a swivelable top plate having means for mounting thereon a fishing apparatus;
    a bottom plate having means for attachment to a boat;
    a shaft rotatably connecting the top plate in axial alignment above the bottom plate;
    a first engaging means associated with the top plate and disposed toward the bottom plate,
    a second engaging means associated with the bottom plate disposed toward and in spaced engageable alignment with the first engaging means; and
    a means for moving one engaging means into engagement with the other engaging means to lock the angle of rotation between the top and bottom plates, and for selectively moving said one engaging means out of engagement with the other engaging means to allow the top plate to swivel in relation to the bottom plate; the means for moving comprising an adjusting ring coaxial with and rotatable around the bottom plate, disposed under and in contact with the second engaging means, and having camming means defined by contacting surfaces of the adjusting ring and the second engaging means for moving the second engaging means into or out of engagement with the first engaging means when the adjusting ring is rotated.

2. A mount as in claim 1, which further includes:
    spring means biasing the adjusting ring in a direction to engage the first and second engaging means, whereby manual rotation of the adjusting ring against the spring bias is required to disengage the engaging means and permit rotation of the top plate.

3. A mount as in claim 1, wherein:
    the first engaging means is a ring of spaced serrated teeth, and the second engaging means is second ring of spaced serrated teeth having a ring diameter, tooth size and tooth spacing matched for locking engagement with the first ring.

4. A mount as in claim 3, wherein:
    the teeth of the first ring are equally spaced at intervals of approximately 10°.

5. A mount as in claim 1, which further includes:
    drag means for producing a frictional resistance to swiveling of the top plate in relation to the bottom plate.

6. A mount as in claim 5 wherein the drag means is adjustable to increase or decrease the frictional resistance to swiveling of the top plate.

7. A mount as in claim 6, wherein the drag means comprises:
    a drag plate fixed to the top plate and in sliding surface contact with the bottom plate.

8. A mount as in claim 3, which further includes:
    drag means for producing a frictional resistance to swiveling of the top plate in relation to the bottom plate.

9. A mount as in claim 8, wherein the drag means is adjustable to increase or decrease the frictional resistance to swiveling of the top plate.

10. A mount as in claim 9, which further includes:
    a drag plate fixed to the top plate and in sliding surface contact with the bottom plate.

11. A mount as in claim 1, in which:

the means for attaching the bottom plate to a boat comprises a plurality of threaded fasteners, and the bottom plate has a plurality of fastener holes passing through said plate.

12. A mount as in claim 11, which further includes:
the fastener holes being located in chambers in the bottom plate having sufficient dimensions to accept and allow the operation of an appropriate driver for the fasteners.

13. A mount as in claim 12, which further includes:
the top plate having an access hole located at a radial position such that it may be swiveled into alignment over each fastener chamber.

14. A mount as in claim 3, in which:
the means for attaching the bottom plate to a boat comprises a plurality of threaded fasteners, and the bottom plate has a plurality of fastener holes passing therethrough.

15. A mount as in claim 14, which further includes:
the fastener holes being located in chambers in the bottom plate having sufficient dimensions to accept and allow the operation of an appropriate driver for the fasteners.

16. A mount as in claim 15, which further includes:
the top plate having an access hole located at a radial position such that it may be swiveled into alignment over each fastener chamber.

17. A swivelable base mount for a downrigger, comprising:
a swivel top plate having means for mounting thereon a downrigger apparatus;
a bottom plate in fixed position attachment to a boat;
a shaft rotatably connecting the top plate in axial alignment above the bottom plate;
a first engaging ring of spaced engagable surfaces associated with the top plate and disposed toward the bottom plate;
a second engaging ring of spaced engagable surfaces associated with the bottom plate, disposed toward and in engagable alignment with the first engaging ring; and
a means for moving one engaging ring into engagement with the other engaging ring to lock the angle of rotation between the top and bottom plates, and for selectively moving said one engaging ring out of engagement with the other engaging ring to allow the top plate to swivel in relation to the bottom plate;
the means for moving comprising an adjusting ring coaxial with and rotatable around the bottom plate, disposed under and in contact with the second engaging ring, and having camming means defined by the contacting surfaces of the adjusting ring and the second engaging ring for moving the second engaging ring into or out of engagement with the first engaging ring when the adjusting ring is rotated.

18. A mount as in claim 17, which further includes:
spring means biasing the adjusting ring in a direction to hold the first and second engaging ring in engagement, whereby manual rotation of the adjusting ring against the spring bias is required to disengage the engaging means and permit rotation of the top swivel plate.

19. A mount as in claim 18 wherein:
the spaced engagable surfaces of the first and second engaging ring are serrated teeth having a tooth size and tooth spacing matched for locking engagement with each other.

20. A mount as in claim 19, wherein:
the teeth are equally spaced at intervals of approximately 10°.

* * * * *